United States Patent [19]

Takazume et al.

[11] Patent Number: 4,633,065
[45] Date of Patent: Dec. 30, 1986

[54] CONVECTION COOKING APPARATUS

[75] Inventors: Masafumi Takazume, Osaka; Kazuhiko Ishikawa, Kashiwara, both of Japan

[73] Assignee: Sharp Kabushiki Kaisha, Osaka, Japan

[21] Appl. No.: 715,290

[22] Filed: Mar. 25, 1985

Related U.S. Application Data

[63] Continuation of Ser. No. 443,698, Nov. 22, 1982, abandoned.

[30] Foreign Application Priority Data

Nov. 26, 1981 [JP] Japan .......................... 56-176285[U]

[51] Int. Cl.⁴ ............................................. H05B 11/00
[52] U.S. Cl. .................................... 219/400; 219/396; 219/494; 219/10.55 R
[58] Field of Search ............... 219/400, 396, 494, 516, 219/10.55 B, 10.55 R; 99/325

[56] References Cited

U.S. PATENT DOCUMENTS

| | | | |
|---|---|---|---|
| 2,820,130 | 1/1958 | Dadson | 219/494 |
| 2,983,585 | 4/1960 | Holtkamp | 219/516 |
| 3,003,048 | 10/1961 | Scott | 219/516 |
| 3,212,709 | 10/1965 | Hanssen | 219/516 |
| 3,259,056 | 7/1966 | King | 219/516 |
| 4,309,584 | 1/1982 | Terakami | 219/10.55 B |
| 4,332,992 | 6/1982 | Larsen | 219/10.55 B |
| 4,370,535 | 1/1983 | Noda | 219/10.55 B |
| 4,392,038 | 7/1983 | Day | 219/400 |

Primary Examiner—E. A. Goldberg
Assistant Examiner—Teresa J. Walberg
Attorney, Agent, or Firm—Birch, Stewart, Kolasch & Birch

[57] ABSTRACT

A convection cooking apparatus including an oven temperature sensing element and a food temperature sensing probe. In response to an output signal from the oven temperature sensing element, the oven temperature is maintained at a desired value. When the food temperature reaches a desired value, a control system develops a control signal to terminate the cooking operation. That is, the cooking operation is performed under a desired oven temperature, and the cooking completion is determined in accordance with the actual food temperature.

1 Claim, 3 Drawing Figures

CONVECTION COOKING APPARATUS

This application is a continuation, of application Ser. No. 443,698 filed on Nov. 22, 1982 now abandoned.

BACKGROUND AND SUMMARY OF THE INVENTION

The present invention relates to a convection cooking apparatus wherein heated air is recirculated in an oven cavity to cook the foodstuff.

Generally, in a convection cooking apparatus, a temperature control system is provided for maintaining an oven temperature at a preselected value. On the other hand, a desired cooking period is preset in accordance with the kind and the amount of the foodstuff to be cooked. Thus, the cooking completion condition varies depending upon the initial state of the foodstuff. More specifically, when the foodstuff to be cooked has a relatively high temperature at its initial state, there is the possibility that the foodstuff will be overcooked beyond a desired level. That is, the cooking period control of the conventional system does not ensure a desired cooking operation.

Accordingly, an object of the present invention is to provide a cooking control system in a convection cooking apparatus, which ensures a stable cooking operation.

Another object of the present invention is to provide a novel temperature control system in a convection cooking apparatus.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a food temperature sensing probe is provided in addition to the oven temperature control system. The oven temperature control system functions to maintain the oven temperature at a desired value. When the food temperature detected by the food temperature sensing probe reaches a preset value, the cooking operation is terminated. Since the completion of the cooking is determined in accordance with the actual temperature of the foodstuff detected by the food temperature sensing probe, effective cooking is ensured without regard to the initial state of the foodstuff to be cooked.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Figure 1:
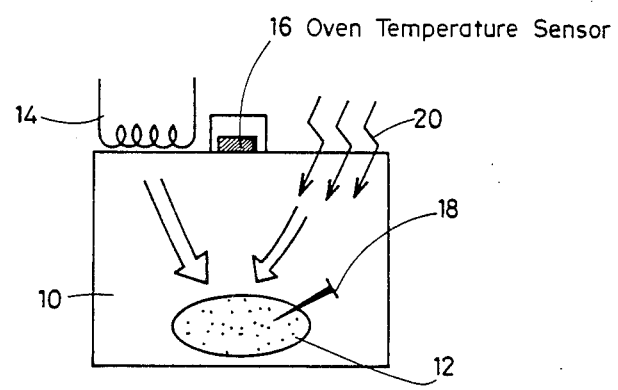
FIG. 1 is a schematic sectional view of an embodiment of a convection cooking apparatus of the present invention.

The convection cooking apparatus of the present invention includes an oven cavity 10 in which a foodstuff 12 is disposed. A heater 14 associated with a fan system (not shown) is provided for creating a recirculating flow of a heated air, thereby heating the foodstuff 12 disposed in the oven cavity 10. The oven cavity temperature is detected by an oven temperature sensing element 16, which is secured to an oven wall, whereby the oven temperature is maintained at a desired level. A food temperature sensing probe 18 is provided for detecting the temperature of the foodstuff 12. The food temperature sensing probe 18 includes a temperature sensing element such as a thermistor disposed at the tip end thereof. The convection cooking apparatus of the present invention can perform a mixed cooking operation, wherein the convection cooking (activated by the heater 14) and a microwave cooking (20 represents microwaves generated by a magnetron) are alternately conducted.

A keyboard panel 22 is provided for presetting a desired oven temperature to be maintained and a desired food temperature at which the cooking operation should be completed. The desired food temperature introduced from the keyboard panel 22 is stored in a food temperature set memory 24. The actual food temperature detected by the food temperature sensing probe 18 is introduced into a food temperature detecting circuit 26. A first comparator 28 is provided for comparing the set value stored in the food temperature set memory 24 and the actual value measured by the food temperature detecting circuit 26. The desired oven temperature introduced from the keyboard panel 22 is stored in an oven temperature set memory 30. The actual oven temperature detected by the oven temperature sensing element 16 is introduced into an oven temperature detecting circuit 32. A second comparator 34 is provided for comparing the set value stored in the oven temperature set memory 30 and the actual oven temperature measured by the oven temperature detecting circuit 32. Output signals of the comparators 28 and 34 are applied to a control signal generation circuit 36. The above-mentioned memories 24 and 30, detecting circuits 26 and 32, comparators 28 and 34, and control signal generation circuit 36 are incorporated in a single-chip microprocessor unit 38. In a preferred form, the single-chip microprocessor unit 38 is implemented with "HMCS 45A" manufactured by Hitachi Ltd. of Japan or "M58845A" manufactured by Mitsubishi Denki Kabushiki Kaisha of Japan.

Control signals developed from the control signal generation circuit 36 are applied to a heater relay 40 and a magnetron relay 42. The heater relay 40 controls a relay 44 which controls the power supply to the heater 14. The magnetron relay 42 is associated with a relay 46 which controls the power supply to a magnetron 48. The heater 14, a transformer 50 and a magnetron drive high-voltage transformer 52 are supplied with power derived from a commercial power service 54 (A.C. 100 V). A power supply circuit 56 is disposed between the transformer 50 and the single-chip microprocessor unit 38 for supplying power to the single-chip microprocessor unit 38. The secondary winding of the magnetron drive high-voltage transformer 52 is connected to a high-voltage capacitor 58 and a high-voltage diode 60 as is well known in the art.

Figure 3:
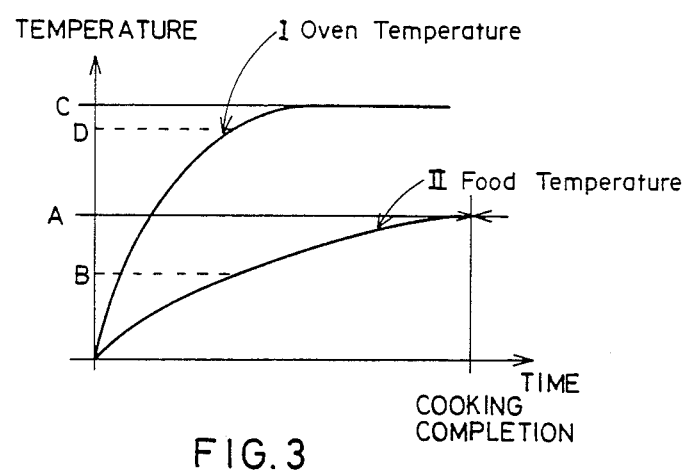
FIG. 3 is a graph for explaining an operational mode of the convection cooking apparatus of FIGS. 1 and 2.
Figure 2:
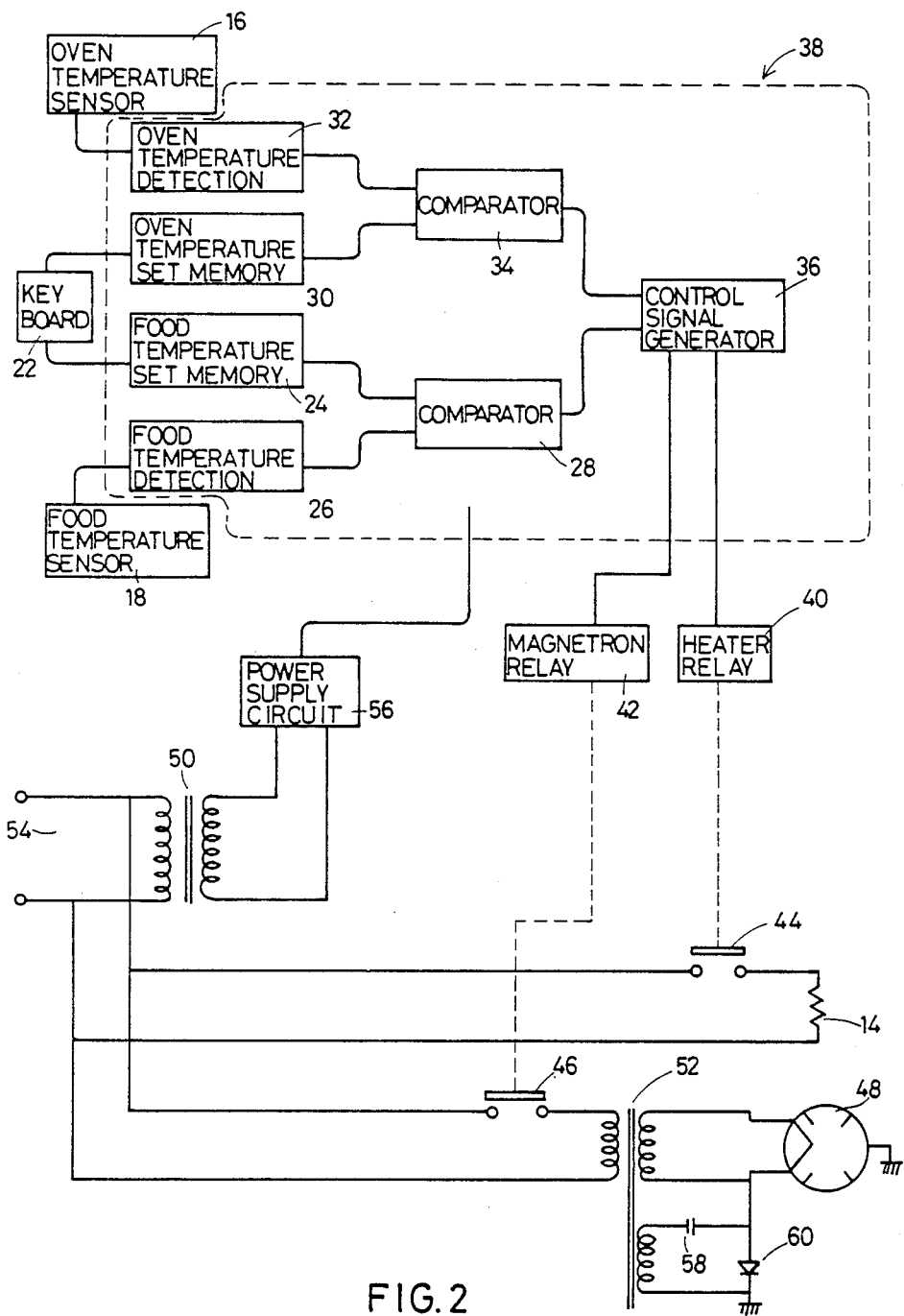
FIG. 2 is a block diagram of a control circuit of the convection cooking apparatus of FIG. 1.

FIG. 3 shows the food temperature variation and the oven temperature variation when the desired oven temperature is set at a temperature "C" and the desired food temperature is set at a temperature "A". A curve "I" depicts the variation of the actual oven temperature, and a curve "II" depicts the variation of the actual food temperature.

First, the desired oven temperature "C" is introduced into and stored in the oven temperature set memory 30, and the desired food temperature "A" is introduced into and stored in the food temperature set memory 24. While the cooking operation is conducted, the actual oven temperature "D" measured by the oven temperature detecting circuit 32 is compared with the set temperature "C" at the second comparator 34, and the actual food temperature "B" measured by the food temperature detecting circuit 26 is compared with the set temperature "A" at the first comparator 28. Generally, the oven temperature "D" reaches the set temperature "C" before the food temperature "B" reaches the set value "A". When the actual oven temperature "D" reaches the desired set value "C", the control signal generation circuit 36 develops the control signal to activate the heater relay 40, thereby deenergizing the heater 14. The heater 14 is intermittently energized to maintain the oven temperature at the desired value "C" as is well known in the art. In this way, the convection cooking operation is continued. When the actual food temperature "B" measured by the food temperature detecting circuit 26 reaches the preset value "A", the first comparator 28 develops a detection output. Accordingly, the control signal generation circuit 36 develops a cooking completion signal to complete the convection cooking operation.

In the mixed cooking operation, as is well known in the art, the magnetron 48 is energized while the heater 14 is deenergized in the above-mentioned intermittent drive mode.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A convection cooking apparatus comprising:

a convection heater which is intermittently energized to maintain the oven temperature at a desired value;

a magnetron which is intermittently energized to alternate with said convection heater;

power supply means for providing power to said convection heater and said magnetron;

a keyboard panel for introducing a desired oven temperature at which the cooking operation should be performed, and a desired food temperature at which the cooking operation should be completed;

a first memory for storing said desired oven temperature introduced from said keyboard panel;

a second memory for storing said desired food temperature introduced from said keyboard panel;

oven temperature measuring means for measuring an actual oven temperature;

a first comparator for comparing said actual oven temperature measured by said oven temperature measuring means with said desired oven temperature stored in said first memory;

a first control system for intermittently energizing said heater in response to an output signal developed from said first comparator for maintaining the actual oven temperature around said desired oven temperature;

food temperature measuring means for measuring an actual food temperature;

a second comparator for comparing said actual food temperature measured by said food temperature measuring means with said desired food temperature stored in said second memory; and a second control system for terminating the cooking operation in response to an output signal developed from said second comparator so that the cooking operation is terminated when said actual food temperature reaches said desired food temperature, said output signals from the first and second comparators being applied to a control signal generator for controlling the power supply to the convection heater and the magnetron, whereby microwave heating and convection heating are conducted in an alternative manner until a preset temperature is reached in the atmosphere of the apparatus.

* * * * *